United States Patent
Domenico

[11] 3,901,935
[45] Aug. 26, 1975

[54] CYANOPHENYL SULFOXIDES AND SULFONES

[75] Inventor: Penelope B. Domenico, Fairfax, Va.

[73] Assignee: The Dow Chemical Company, Midland, Mich.

[22] Filed: Feb. 19, 1974

[21] Appl. No.: 443,593

[52] U.S. Cl............. 260/465 G; 71/103; 106/15 R; 424/304
[51] Int. Cl.²............... C07C 121/52; C07C 121/56
[58] Field of Search................................ 260/465 G

[56] References Cited
UNITED STATES PATENTS

| | | |
|---|---|---|
| 3,018,304 | 1/1962 | Heininger et al. .................. 260/465 |
| 3,140,307 | 7/1964 | Heininger et al. .................. 260/465 |
| 3,535,365 | 10/1970 | Weinstock et al. .................. 260/465 |

FOREIGN PATENTS OR APPLICATIONS

| | | |
|---|---|---|
| 1,933,525 | 1/1971 | Germany |
| 951,651 | 3/1964 | United Kingdom |

*Primary Examiner*—Elbert L. Roberts
*Assistant Examiner*—Dolph H. Torrence
*Attorney, Agent, or Firm*—J. Roger Lochhead; Robert R. Stringham

[57] ABSTRACT

Fungicidal cyanophenyl sulfoxides and sulfones having the formula:

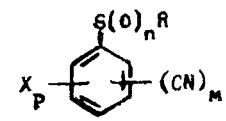

wherein $m$ is 1 or 2; $n$ is 1 or 2; $p$ is 2, 3 or 4; R is an alkyl or alkenyl group having 1 to 4 carbons and substituted with zero to two —Br, —Cl or F radicals; and X is —Br or —Cl, independently in each occurrence. The dicyano compounds are more active and are accordingly preferred. The disclosed compounds are of particular utility as paint film preservatives and microbicides.

10 Claims, No Drawings

CYANOPHENYL SULFOXIDES AND SULFONES

BACKGROUND OF THE INVENTION

U.S. Pat. No. 3,290,353 discloses benzonitriles, terephthalonitriles and isophthalonitriles substituted with one to four halogens and having utility as fungicides, bactericides, nematocides and herbicides. The patented compounds, however, are not taught to have utility as paint film fungistats.

U.S. Pat. No. 3,639,413 discloses aryl alkyl sulfoxides and sulfones ring-substituted with one or two nitrile groups and with up to 3 halogens. Some of the disclosed compounds have utility as mildewicides in latex paints but in all of the compounds the aromatic ring contains a nitrogen atom; i.e., the compounds are pyridines.

German Patent disclosure 1,933,525 (1/21/71) teaches the utility of polychloro-mono- and dicyano benzenes substituted with an alkyl mercapto group as intermediates for the preparation of corresponding hydroxy benzoniitriles containing one less chlorine. U.S. Pat. No. 3,764,697 teaches certain of these mercaptans as being useful for controlling helminths.

SUMMARY OF THE DESCRIPTION

The invention is a group of compounds corresponding to the formula:

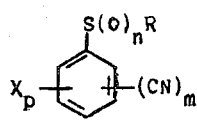

wherein R is an alkyl or alkenyl group having one to four, preferably one or two, carbons and substituted with zero to two —Br, —Cl or —F radicals; $m$ is 1 or 2; $n$ is 1 or 2; $p$ is 2, 3 or 4 and X is Br or Cl, independently in each occurrence. These compounds are crystalline solids or oils which are generally of low solubility in water and of moderate solubility in common organic solvents. They have utility as industrial preservatives, particularly in paint films. They are also useful as fungicides, herbicides, insecticides, and microbicides.

Those compounds in which the sum of $m$ and $p$ is 5 are readily prepared from the corresponding perhalo mono- and dicyano benzenes, which are generally more economic starting materials. Also, the compounds in which $m + p$ is 5 are generally more active and more resistant to leaching by water. Accordingly, these compounds constitute a preferred sub-genus.

Those compounds of the above formula containing two cyano groups are more active on a greater variety of organisms and constitute a particularly preferred sub-genus of the present invention. Especially preferred within the latter class of compounds are those in which $m + p$ is 5. This embodiment includes compounds which have been found to be particularly active as paint fungistats.

Those perchloro and perbromo compounds containing a single nitrile moiety and in which the —S(O)$_n$R group is in the para position thereto are more directly preparable and constitute yet another subgenus of the invention.

The compounds of the invention are prepared from known starting materials, such as, for example, the polychloro-benzonitriles, -terephthalonitriles and -isophthalonitriles of U.S. Pat. No. 3,290,353. Tetrachlorophthalonitrile is available from Aldrich Chemical Company. Tetrabromophthalonitrile can be prepared as described by Birchall, et al; J. Chem. Soc (c); 456–462 (1970).

When such compounds are employed as the starting materials, two main synthetic steps are generally requred: (1) replacement of a ring halogen substituent with an -SR group, and (2) oxdidation of the —SR group to an —S(O)R or —S(O$_2$)R group.

Corresponding starting materials in which some or all of the chlorines are replaced with bromines can be prepared by halogen exchange or by bromination of mono- or dicyano benzenes substituted with from 0 to 4 chlorines. The method of U.S. Pat. No. 3,595,868 for vapor phase bromination of cyanopyridines is adaptable to the latter purpose.

DETAILED DESCRIPTION OF THE INVENTION

Typical alkyl, alkenyl, haloalkyl and haloalkenyl groups represented by R in the above formula are ethyl, isopropyl, allyl, fluoromethyl, 2,3-dibromopropyl and sec-butyl groups. Typical halogenated mono- and dicyano phenyl groups are: tetrachloro-4-cyanophenyl; tetrabromo-4-cyanophenyl; trichloro-2,3-dicyanophenyl; tribromo-2,6-dicyanophenyl; 2,3,5-tribromo-6-chloro-4-cyanophenyl; 4,6-dibromo-2,5-dicyanophenyl; 4,6-dichloro-2-cyanophenyl; and 4,5,6-trichloro-3-cyanophenyl. Typical compounds of the invention consist of any of the foregoing R groups linked to any of the recited exemplary substituted phenyl groups through sulfinyl

or sulfonyl

groups.

Halogenated mono- and dicyanobenzenes suitable for the preparation of the compounds of the invention through replacement of a halo-moiety with an -SR group have the formula:

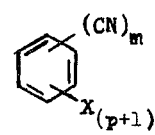

wherein $m$ and $p$ are as above defined. Typical of such starting materials are pentachlorobenzonitrile, perbromobenzonitrile, tetrachlorophthalonitrile, tetrabromoisophthalonitrile, 2,3,6-tribromo-4,5-dichlorobenzonitrile; 2,3,6-tribromo-1,4-dicyanobenzene; 2,3,5-trichlorobenzonitrile and 2,3,4,5-tetrachlorobenzonitrile.

PREFERRED EMBODIMENTS

A preferred group of benzonitriles are those having the formula:

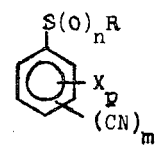

where $m$, $n$, $p$, R and X are as above defined, but with the restriction that $m + p = 5$. Within this group, those compounds in which X is the same (Br or Cl) in each occurrence constitute a more preferred subclass. A second, more preferred sub-class of compounds of the preceding formula are those in which $m$ is 2, i.e., dicyano compounds. Yet another such sub-class is made up of those compounds of the preceding formula in which X is Br or Cl, the same in each occurrence ($m + p = 5$ or less).

The most highly preferred compounds of the invention are those of the preceding formula in which $m + p = 5$, is 2 and X is -Br or -Cl (the latter being particularly preferred) the same in each occurrence. These compounds are not only generally more active on a wider variety of organisms and in more diverse environments but are also directly preparable from more readily available materials. Particularly preferred are such compounds in which R is a substituted or unsubstituted alkyl group having one or two carbons.

Independently of other considerations, those compounds of the invention which are sulfones are generally more active than the corresponding sulfoxides and are accordingly more preferred.

Methods of Preparation

The compounds of the invention are prepared in two main synthetic steps from mono- and dicyano benzenes substituted with from 3 to 5 chlorines and/or bromines. In the first step a reactive halogen is replaced with an —SR group by one of several alternative procedures. The resulting sulfide is then oxidized to the corresponding sulfoxide or sulfone with an appropriate oxidant/solvent combination.

In one method of replacing a chlorine or bromine with an —SR group, the halo moiety is initially converted to an —S—Na group which is in turn reacted with an appropriate alkyl or alkenyl halide, such as methyl iodide, allyl bromide or 1-chloro-2-fluoropropane. The sodium mercaptide (—SNa) intermediate is made by reaction of the halocyanobenzene with sodium sulfide (generally as the nonahydrate). As a variant of this, a halocyanophenyl thiol (from whatever source) is reacted with sodium methoxide in methanol.

In an alternative procedure, the halocyanobenzene is reacted with a sodium alkyl mercaptide, Na—S—R, which is conveniently formed in situ from the corresponding mercaptan and metallic sodium.

In a second alternative procedure, a halocyanophenyl mercaptan (obtained by acidification of the —SNa salt or otherwise) is reacted with a halogen, such as chlorine for example, to provide the corresponding sulfenyl halide (—SCL, for example). The latter in turn is adducted with an appropriate unsaturate, such as ethylene or acetylene, for example, to form a corresponding Beta-halo-alkyl or -alkenyl sulfide.

The foregoing procedure is applicable for the preparations of compounds in which the R moiety contains at least two carbons and at least a beta-halogen. Alpha-halo R groups are most conveniently introduced by halogenation of a corresponding —SR compound in which the alpha carbon of the R group has at least one reactive hydrogen. Alternatively, halogen-containing reactants, such as $Br_2$, $Cl_2$ or HBr may be added to the double bond in an —S— alkenyl compound, such as —S—$CH_2$—CH=$CH_2$.

In the halogen substituted benzonitrile starting materials, a halogen para to the nitrile group will generally be more reactive with $NaS^-$ or $RS^-$ than a halogen substituent in either of the ortho positions and halogens in either meta position will be comparatively unreactive. On the other hand, chlorine substituents are generally more readily replaced than bromine substituents and this effect may reinforce or oppose influences of position. Thus, benzonitriles substituted with bromine in the 4 (para) position and with chlorine in a 2 or 6 (ortho) position may undergo nucleophilic attack at either or both positions, depending on relative reactant concentrations, dilution, solvent choice and temperatures, according to principles well known to practising chemists. Such mixed products are separated by known techniques, such as preparative vapor phase chromatography, column chromatography, fractional crystallization and gel permeation chromatography. The configurations of the separated products are determined by Infrared or Ultraviolet Spectrophotometry, Nuclear Magnetic Resonance and/or 3-dimensional X-ray diffraction.

The halogen most readily displaced by nucleophiles in each of the following polyhalobenzonitriles is indicated with an asterisk (X=Br or Cl):

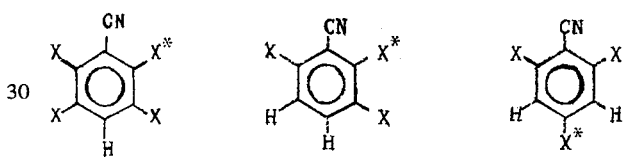

The positions of nucleophilic attack on the polyhalodicyanobenzenes depend not only on the kind and position of each halogen but also on the relative positions of the two nitrile groups. Thus, in those m-dicyano compounds (isophthalonitriles) in which all of the halogen substituents are alike (bromine or chlorine), the predominant position of attack is in the 6-position and the sole or principal product (depending on factors as above noted) is the 2,4,5-trihalo-6-(alkylthio)isophthalontrile. If the two nitrile groups are para to each other and the other four positions are substituted with the same kind of halogen (chlorine or bromine), only one product can result from replacement of a halogen with an —SNa or —SR moiety. In the case of two nitrile groups ortho to each other, as in tetrabromoor tetrachlorophthalonitrile, the ease of displalcement of halogen ortho to a cyano group is less than for a halogen para to a cyano group and the 5 —SNa or —SR compound will generally be the sole product.

In those dinitriles in which four or less halogen substituents are present, that halogen is most readily displaced which is ortho or para to a nitrile group and most often ortho or para to the other nitrile group and to the other halogen substituents. Again, positional effects are augmented or weakened by the inherent differences in reactivity between chlorine and bromine substituents when both are present.

Di-(or mono-) cyanobenzene sulfides containing less than the maximum possible number of halogen substituents can be conveniently prepared from the corresponding perhalocyano benzene sulfides by reduction. (See Example 24).

In the event that a tendency to bis-alkyl sulfide formation is shown by a particular halogenated nitrile starting material upon reaction with RS⁻, sodium sulfide should be employed instead of the sodium mercaptide. The initial reaction product with sodium sulfide is a halocyanophenyl anion, from which displacement of a second halogen by a negative species (such as NaS⁻) is much more difficult. On the other hand, RS⁻ is generally a better choice when the halogen to be replaced in the starting material is of lower than usual reactivity. For example, in 2,3,5,6-tetrabromobenzonitrile, the ortho bromines are in relatively activated positions but are less readily displaced than would be a chlorine in an ortho position or a halo substituent in the para position.

Oxidation Step

A variety of oxidant/solvent combinations can be used in the second step. Hydrogen peroxide is a convenient oxidant for use in the laboratory and can also be employed on a larger scale if due care is exercized. This oxidant is generally used, as an aqueous solution, in conjunction with an acidic medium such as trifluoroacetic acid, acetic acid/acetic anhydride or concentrated sulfuric acid. Since nitrile groups are subject to acid hydrolysis, acid systems such as the latter two, which react with water, and hydrogen peroxide solutions of relatively high concentrations are preferred.

Water-miscible organic solvents, such as acetone or ethanol can also be employed, provided the peroxide concentration in the aqueous peroxide solution is *not* in excess of about 30 percent. Preferably, such solvents are not employed.

Another suitable oxidant is 70–80% nitric acid, which may also act as a solvent to at least a sufficient extent. This oxidant is generally less powerful and thus may be preferentially employed when it is desired to isolate the sulfoxide intermediate as the principal product. If desired, an inert solvent for the sulfur compound to be oxidized, such as, for example, carbon tetrachloride, may be used in conjunction with nitric acid.

Chlorine water can also be used as an oxidant, at least with those sulfides which are not so resistant to oxidation as to require conditions of such severity that hydrolysis of nitrile groups is promoted. When this oxidant is employed, the sulfide is introduced to the reaction as a slurried solid and the temperature preferably is kept lower than the melting point of the lowest melting cyanobenzene species present.

In preparing the sulfonyl compounds of the invention, it is preferable to employ an excess of the oxidizing agent. However, in preparing the sulfinyl compounds ($n=1$), it is often preferable not to provide oxygen apreciably in excess of the stoichiometric quantity for the desired reaction and to employ milder conditions and/or oxidants.

In many instances, the sulfinyl compound may be prepared and oxidized — in situ or in a separate procedure — to the corresponding sulfonyl compound.

Since both the sulfones and sulfoxides are active in their own right, technical grade sulfoxide or sulfone products containing minor proportions of the corresponding sulfone or sulfoxide are often suitable for a given application.

Solvents, Temperatures and Contact Times

Suitable media for the replacement of chlorine or bromine substituents with NaS— or RS— are solutions of water in solvents such as methanol, ethanol, isopropyl alcohol; 1,2-dimethoxyethane (DME), dimethyl sulfoxide (DMSO) and dimethyl formamide (DMF). Solutions of sodium sulfide in the latter solvent are strongly reducing in nature and DMF is relatively high boiling. Thus, such DMF solutions are advantageous for displacement of less reactive halogen substituents, such as in a position meta to a cyano group.

The displacement reactions are generally carried out at temperatures of about 45°–100°C., usually in a solvent which will reflux at the desired temperature. In some instances, the reactions are run at reflux in such higher boiling solvents as DMF or DMSO. Sodium sulfide is conveniently obtainable as the nonahydrate. Since the presence of an appreciable proportion of water is generally essential to solubilization of the sodium sulfide, the latter does not have to be anhydrous. Contact times of about 1 hour are usually adequate for completion of the reaction. However, the contact time can range from a few minutes to a day, depending on the reactivity of the halogen to be displaced, reactant concentrations, solvent choice, temperature, etc.

Chlorination of the halocyanophenyl —SH compounds to the corresponding —SCl compounds is carried out in an inert solvent, such as carbon tetrachloride, with actinic catalysis. Temperatures of about 50° to 80°C. are generally sufficient for a practicable rate of reaction. Contact times of from 1 to 8 hours are generally satisfactory for such halogenations.

The reaction of a halocyanophenyl —SNa compound with an alkyl or alkenyl halide to form the corresponding —SR compound is carried out in the same types of solvents employed for preparation of the —SNa salt. Generally, it is convenient to utilize the salt in situ, i.e., as formed in solution. The alkyl (or alkenyl) halide can be added neat or as a solution — preferably in the same solvent. For this reaction, temperatures of from about 25° to 85° and contact times up to several hours are usually sufficient.

Suitable solvents for alpha halogenation of alkyl R groups in halocyanophenyl —SR compounds are inert liquids, such as $CCl_4$. Temperatures of from 25° to the boiling point of the solvent are suitable but the range of about 45°–65°C. is preferred. Contact times of from about 3 to 8 hours are generally sufficient but in some cases longer times may be required for good conversions.

For the adduction of halogen-containing materials with unsaturated R groups, suitable solvents, conditions and contact times are as commonly employed for such addition reactions in general.

The adduction of a halocyanophenyl sulfenyl halide with an unsaturate is carried out in an inert solvent, such as benzene, carbon tetrachloride or the like. The solution resulting from halogenation of the —SH compound can be employed for the adduction, provided that it has first been freed of unreacted chlorine, as by heating under- reduced pressure or distilling off some of the solvent. The unsaturate can be introduced neat or as a solution, preferably in the same solvent. Temperatures up to the boiling point of the reaction mixture may be employed but 15°–60°C. is a generally suitable range. Contact times of several hours are usually sufficient.

For preparation of halocyanophenyl —SR compounds by halogen displacement with RS⁻, the same type of solvents used for displacement by NaS⁻ are suitable. However, water is essentially excluded from the reaction mixture. The sodium (or potassium) salt of the mercaptan (RS—Na) can be prepared separately, as by reaction of the mercaptan with metallic sodium dissolved or suspended in an inert liquid. Preferably, however, the salt is prepared in the reaction medium (preferably methanol) by reaction with sodium (or potassium) methoxide. The R—S—Na solution is then added — usually incrementally — to a solution of the halocyanobenzene in the same solvent at the desired reaction temperature. Temperatures ranging from 45°–100°C. are generally suitable but higher temperatures may be employed (with appropriately higher boiling solvents) when the halogen substituent to be displaced is of low reactivity. Contact times of from about 15 minutes to a day can be employed but for most preparations, two or three hours of contact is sufficient.

In those sulfide oxidations wherein an acidic peroxide solution is used, aqueous hydrogen peroxide solutions having concentrations of from about 20 to 80% can be employed. When the higher concentration solutions are used, the initial amount added preferably is only sufficient to provide the requisite minimal oxidant activity and subsequent additions are in small increments just sufficient to maintain this activity as the reaction progresses. Suitable temperatures for such oxidations range from those at which any appreciable exothermicity is noted, i.e., about 10° 1 to about 120°C. However, in media favorable to nitrile group hydrolysis such as sulfuric acid, residence times at temperatures above about 85°C. should generally be of minimal duration. Reaction times of from about 10 minutes to several hours are generally suitable. In those instances in which a high peroxide concentration is essential to effect oxidation, it is necessary to resort to lower temperatures, such as 10°–20°C., at which the peroxide is more stable. Correspondingly longer contact times may then be required.

When nitric acid is employed, temperatures of from about 50° to 90°C. are suitable. For sulfoxide preparations, from about 5 to 15 minutes at about 75°C. is preferred. For sulfone preparations, higher temperatures and longer contact times, i.e., up to several hours, are needed.

Work-ups

Standard work-up procedures, such as stripping under reduced pressure, evaporative concentration, dilution with a non-solvent or chilling to effect phasing out of the product, filtration, recrystallization, distillation, etc., are suitable for each of the preceding types of reaction mixtures.

SPECIFIC EXAMPLES

I. Preparations

Example 1 — Displacement of a bromine substituent with -SNa and conversion to —SH.

A solution of 5 grams 0.02 ).02 moles) of $Na_2S \cdot 9H_2O$ in water was added to a solution of 10 grams (0.02 moles) of pentabromobenzonitrile in a mixture of 50 ml. of 1,2-dimethoxyethane and 25 ml. of water. After stirring several minutes at room temperature the resulting mixture was warmed to 60°C. and became homogeneous. Upon addition of just enough hydrochloric acid to give an acid test with pH paper, a yellow solid precipitated. When filtered out and dried, this solid weighed 6.62 grams (75.3% of theory). When taken up in benzene, dried over $Na_2SO_4$, reprecipitated with hexane and dried on a porous plate, the product, 2,3,5,6-tetrabromo-4-mercaptobenzonitrile, melted at 258°C.

| Elemental Analysis: | % C | % H | % Br | % N | % S |
| --- | --- | --- | --- | --- | --- |
| Calc. for $C_6HBr_4NS$ | 16.42 | 0.23 | 72.85 | 3.19 | 7.31 |
| Found | 16.27 | 0.35 | 72.74 | 3.19 | 6.98 |

Example 2 — Displacement of a chlorine substituent with —SNa and conversion of —SH.

A solution of 17.53 grams (0.073 moles) of $Na_2S \cdot 9H_2O$ in water was quickly added to a stirring solution of 20 grams (0.0728 moles) of pentachlorobenzonitrile in a mixture of 100 ml. of DME and 50 ml. of water at −10°C. An immediate color change occurred. After a brief period at 60°C., the reaction mixture was sampled and tested. Since unreacted starting material was still present, a few grams more of sodium sulfide nonahydrate was added and the mixture heated for 15 minutes. A small amount of insoluble solid was filtered out and the filtrate made just acid. A light tan solid precipitated and was filtered out, dried over $Na_2SO_4$ in benzene solution and recovered by addition of hexane and chilling. 9.4 grams of tetrachloro-4-mercaptobenzonitrile, m.r. 185°–7° was recovered.

| Elemental Analysis: | % C | % H | % Cl | % N | % S |
| --- | --- | --- | --- | --- | --- |
| Calc. for $C_7HCl_4NS$ | 30.8 | 0.37 | 51.90 | 5.14 | 11.72 |
| Found | 31.0 | 0.50 | 51.48 | 4.90 | 11.52 |

Example 3 — Conversion of —SH to —SCl.

15.00 Grams (0.0546 moles) of tetrachloro-4-mercaptobenzonitrile was added incrementally to 500 ml. of chlorine-saturated carbon tetrachloride while chlorine gas was bubbled through the mixture (temperature about 25°–30°C.). When addition was complete, a little insoluble material was filtered out. A third of the filtrate (≈450 ml. total) was stripped under reduced pressure and yielded 5.04 grams (92.6% of theory) of a bright orange solid melting at 138°–140°C.

| Elemental Analysis: | % C | % Cl | % N | % S |
| --- | --- | --- | --- | --- |
| Calc. $C_7Cl_5NS$ | 29.35 | 57.66 | 4.56 | 10.43 |
| Found | 29.0 | 57.38 | 4.9 | 10.29 |

Example 4 — Adduction of —S-halogen with ethylene.

The remaining product solution from the preparation of Example 3, containing about 10 grams of the tetrachlorocyanophenyl —SCl compound, was stirred at room temperature and ethylene gas bubbled in for a period of 2 ½ hours. A little insoluble material was filtered out and the filtrate was stripped under reduced pressure to yield 11.5 grams (98.3% of theory) of a light yellow solid, tetrachloro-4-(2-chloroethylthio)-benzonitrile, m.p. 140°C.

| Elemental Analysis: | % C | % H | % Cl | % N | % S |
| --- | --- | --- | --- | --- | --- |
| Calc. for $C_9H_4Cl_5NS$ | 32.22 | 1.20 | 52.84 | 4.18 | 9.56 |
| Found | 32.5 | 1.3 | 53.28 | 4.4 | 9.62 |

The structure was confirmed by infrared spectroscopy.

Example 5 — Displacement of a chlorine substituent with —SCH$_3$ in tetrachloroisophthalonitrile.

0.866 Grams (0.038 moles) of metallic sodium was dissolved in 40 ml. of methanol and 1.856 grams (0.039 moles) of cold methyl mercaptan added. The resulting mixture was then added dropwise to a refluxing solution of 2,4,5,6-tetrachloroisophthalonitrile (10 grams; 0.038 molels) in 60 ml. of methanol. After 3 hours at reflux, the reaction mixture was filtered (to remove NaCl) and stripped under aspirator vacuum. The residual solid was taken up in hot hexane/benzene, filtered and cooled. A fluffy, light yellow solid (5.2 grams vs. 10.43 g. theoretical) precipitated and was collected. Examination by Nuclear Magnetic Resonance showed the solid to consist of three isomers in the relative amounts of 65%, 30% and 5%. It was later determined that the dominant isomer was formed by replacement of a chlorine ortho to one cyano group in the starting compound and para to the other cyano group.

Example 6 — Preparation of —SCH$_3$ compound through trichlorodicyanophenyl-SNa intermediate.

A solution of 18.01 grams (0.0754 moles) of Na$_2$S·9-H$_2$O in water was rapidly added to a stirring solution of 2,4,5,6-tetrachloroisophthalonitrile in a mixture of 100 ml. of DME and 50 ml. of water at 0°C. The resulting mixture was heated to 45°C. and became clear. Acidification and work-up of an aliquot showed that a solid, analyzing for a trichloro dicyanophenyl mercaptan and melting above 250°C. had been formed in 98% yield. The main portion of the reaction mixture was cooled to 10°C., and an equivalent amount of methyl iodide added. After 30 minutes at reflux temperature, the mixture was cooled and poured into ice water. A yellow solid precipitate was filtered out and dried on a porous plate. The dry solid melted at 152°C. and was obtained in 88.5% yield. By NMR, it was shown to be one compound. By three dimensional X-ray diffraction, this compound was found [1] to be 2,4,5-trichloro-6-(methylthio)isophthalonitrile.

[1] The determination of the configuration of the product by 3-dimensional X-ray diffraction is described by D. R. Carter and F. P. Boer in Vol. II of Perkin Transactions, (pp. 2104–7), Journal of the Chemical Society (1972).

| Elemental Analysis: | % C | % H | % Cl | % N | % S |
|---|---|---|---|---|---|
| Calc. C$_9$H$_3$Cl$_3$N$_2$S | 39.00 | 1.08 | 38.35 | 10.10 | 11.52 |
| Found | 37.8 | 1.1 | 37.94 | 10.00 | 11.54 |

Example 7 — Preparation of tetrachlorocyanophenyl —SCH$_3$ compound through the —SNa intermediate.

A solution of 19.3 grams (0.073 moles + 10% excess) of Na$_2$S·9H$_2$O in water was quickly added to stirring solution of 20 grams of pentachlorobenzonitrile in a mixture of 100 ml. of dimethyl formamide and 50 ml. of water at room temperature. The mixture was heated to 65° and became a clear solution. It was then cooled to 20°C. and 10.36 grams (0.073 moles) of methyliodide added. After stirring 1 hour at room temperature, the mixture was heated until all solids were in solution, recooled, diluted with water and filtered. The dried filtrand, (20 grams; theory 20.89 grams) was found by NMR to include 23% of an isomeric product. One recrystallization from benzene/hexane reduced the content of the latter isomer to about 7%. Two distinct stages of melting, at 90°C. and 121°C., were observed.

| Elemental Analysis: | % C | % H | % Cl | % N | % S |
|---|---|---|---|---|---|
| Calc. for C$_8$H$_3$Cl$_4$NS | 33.41 | 1.044 | 49.40 | 4.87 | 11.18 |
| Found | 33.19 | 1.39 | 49.80 | 4.81 | 10.70 |

Example 8 — Replacement of a chlorine substituent with -S-Ethyl through the tetrachlorocyanophenyl—SNa salt.

a. A solution of 50.4 grams (0.21 moles) of Na$_2$S·9-H$_2$O in 50 ml. of water was added dropwise to a stirring solution of 55.1 grams (0.20 moles) of pentachlorobenzonitrile in 800 ml. of ethanol. The mixture was stirred and refluxed at 80°C. for 1 hour and cooled. 32.8 Grams (0.21 mole) of ethyl iodide was added, dropwise, over a 10-minute period. The reaction mixture was heated to 55°C., maintained at that temperature for 1 hour, cooled, allowed to stir overnight at room temperature and diluted with a liter of water. The resulting precipitate was filtered out, washed and taken up in hot ethanol. Two crops of crystals were recovered by cooling, filtering, concentrating, etc. The first crop (18.2 grams) melted at 102°–5°C. and analyzed by vapor phase chromatography as 96.1% pure tetrachloro-4-ethylthio-benzonitrile. The second crop contained only 40.6% of the desired product.

| Crop 1. Elemental Analysis: | % C | % H | % Cl | % N | % S |
|---|---|---|---|---|---|
| Calc. for C$_9$H$_5$Cl$_4$NS | 35.9 | 1.7 | 47.2 | 4.6 | 10.6 |
| Found | 35.7 | 1.6 | 47.38 | 5.4 | 10.52 | b. When the preparation was repeated on one-half scale in isopropyl alcohol as the reaction solvent, there was obtained 17.1 grams (theory 30.1 grams) of the ethylthio compound (m.r. 101°–6°; 96% pure by V.P.C.; yield 54.4% of theory).

| Elemental Analysis: | % C | % H | % Cl | % N | % S |
|---|---|---|---|---|---|
| Calc. for C$_9$H$_5$Cl$_4$NS | 35.9 | 1.7 | 47.2 | 4.6 | 10.6 |
| Found | 35.6 | 1.5 | 47.16 | 4.7 | 10.84 | c. When the latter preparation was repeated on a 2× scale with the reaction mixture being stirred over a weekend (after ethyl iodide addition), the desired product was obtained in 84% yield, 98.4% pure; m.r. 100°–105°C.

Example 9 — Replacement of chlorine with —S-propyl.

The procedure of Example 8(a) was repeated, but using n-propyl iodide and letting the final reaction mixture stir overnight. The 4-n-propyl sulfide was obtained in 26.6% yield, 93.9% pure; m.r. 90°–3°C. When the reaction was run according to Example 8 (b) (with n-propyl iodide), a 57.5% yield of the product sulfide (m.r. 92°–5°C.; 99.7% pure by V.P.C.) was obtained.

Example 10 — Conversion of —SCH$_3$ to —SCH$_2$Cl.

A solution of 28.7 grams (0.1 mole) of tetrachloro-4-methylthiobenzonitrile in 550 ml. of CCl$_4$ was held at a temperature of 50°–60°C. for 7 hours while chlorine gas was bubbled through it. The solvent was removed by evaporation and the crude residual product recrystallized from a liter of ethanol, some insolubles being filtered off and discarded. The final product melted at 126°–130°C., was 94.3% pure by V.P.C. and constituted a 32.7% yield of the desired chloromethyl sulfide.

| Elemental Analysis: | % C | % H | % Cl | % N | % S |
|---|---|---|---|---|---|
| Calc. for $C_8H_2Cl_5NS$ | 29.9 | 0.6 | 55.2 | 4.3 | 10.0 |
| Found | 29.8 | 0.2 | 55.84 | 5.4 | 10.14 |

Example 11 — Oxidation of —S—$C_2H_5$ to —SO—$C_2H_5$.

15 Grams (0.05 mole) of the product from Example 8(c), tetrachloro-4-ethylthiobenzonitrile, was added with stirring to 175 ml. of conc. nitric acid. The mixture was heated rapidly to 85°C. and maintained at that temperature for 10 minutes. The heat source was removed and about 400 ml. of ice water run into the stirring mixture, followed by about 400 grams of ice. The precipitate, when filtered out, water washed and dried, weighed 15.3 grams (15.8 grams theor. yield), melted at 185°–186°C. and gave only one spot on a thin layer chromatogram.

| Elemental Analysis: | % C | % H | % Cl | % N | % S |
|---|---|---|---|---|---|
| Calc. for $C_9H_5Cl_4NOS$ | 34.1 | 1.6 | 44.8 | 4.4 | 10.1 |
| Found | 34.3 | 1.4 | 45.3 | 4.4 | 10.0 |

Example 12 — Oxidation of —S—$CH_2$—$CH_2CH_3$ to —SO compound.

a. When tetrachloro-4-n-propylthiobenzonitrile (3.9 grams, 0.0125 moles) was treated in the manner of Example 11 with 70 ml. of c. $HNO_3$, the corresponding sulfoxide was obtained as 3.7 grams (4.1 g, theory) of a solid melting at 140°–4°C. and containing only a very small amount of the starting sulfide (by thin layer chromatography, TLC).

| Elemental analysis: | % C | % H | % Cl | % N | % S |
|---|---|---|---|---|---|
| Calc. for $C_{10}H_7Cl_4NOS$ | 36.3 | 2.0 | 42.9 | 4.2 | 9.6 |
| Found | 36.1 | 1.9 | 42.8 | 4.0 | 9.7 | b. When the preparation was repeated on a 4X scale but with a period of 12 minutes at 85°C., no residual sulfide was present in the sulfoxide produce (m.r. 149°–150°; wt. 15.8 grams vs. 16.6 grams theoretical).

Example 13 — Oxidation of —$SCH_2Cl$ to —$SOCH_2Cl$

When 8 grams of tetrachloro-4-chloromethylthiobenzonitrile was treated by the method of Example 12(a), there was obtained 4 grams of the sulfoxide, m.r. 172°–5°C. TLC showed only a very small amount of impurity (starting sulfide) present.

| Elemental Analysis: | % C | % H | % Cl | % N | % S |
|---|---|---|---|---|---|
| Calc. for $C_8H_2Cl_5NSO$ | 28.4 | 0.8 | 52.6 | 4.1 | 9.5 |
| Found | 28.1 | 0.9 | 52.9 | 4.4 | 9.6 |

Example 14 — Oxidation of —SO-ethyl to —$SO_2$-ethyl.

3.17 Grams (0.01 mole) of tetrachloro-4-ethylsulfinylbenzonitrile was dispersed in 15 ml. c. $H_2SO_4$ and the mixture was cooled to about 15°–20°C. 2.25 ml. of 30% $H_2O_2$ (0.02 mole) was added dropwise (15 minutes) while the mixture was stirred and cooled to maintain a temperature of 15°–20°. Stirring was continued for 1 hour and then the mixture was poured into 200 ml. of ice water. The precipitated crude product was found by IR (infrared) and TLC analyses to include unreacted sulfide and was redispersed in c. $H_2SO_4$ and treated in the preceding manner with another 2 ml. of 30% $H_2O_2$. The peroxide was added in 15 minutes at a reaction temperature of about 30°C. and the mixture allowed to stir overnight at room temperature. The crude product was recovered as above, and was a white solid (2.9 g.; m.r. 184°–7° ) found by IR to include about 5% of the corresponding benzamide. Upon recrystallization from ethanol, white needles, m.r. 190°–2°, pure by TLC, were obtained.

| Elemental Analysis: | % C | % H | % Cl | % N | % S |
|---|---|---|---|---|---|
| Calc. for $C_9H_5Cl_4NO_2S$ | 34.1 | 1.59 | 44.73 | 4.42 | 10.11 |
| Found | 33.5 | 1.41 | 44.42 | 4.43 | 9.98 |

NOTE:
The benzamide content of the crude product is not necessarily attributable to the use of water in working up the acid reaction mixture. At 85°, nitrile hydrolysis has been found to be fairly rapid even in concentrated $H_2SO_4$.

Example 15 — Oxidation of —S—$CH_2Cl$ to —$SO_2$—$CH_2Cl$ 6.4 Grams (0.02 moles) of tetrachloro-4-(chloromethylthio)-benzonitrile dissolved in 75 ml. of conc. $H_2SO_4$ was stirred at 25°–35°C. for 2 hours while 6.8 ml. (0.06 moles) of 30% $H_2O_2$ was added dropwise. The mixture was then stirred for 12 hours more at room temperature and run into ice water. The precipitated crude product (≈6 grams) was washed, dried and recrystallized from ethanol to yield 2 grams of a beige colored, crystalline solid, 95% sulfone by TLC, m.r. 188°–190°C. Far-IR analysis confirmed the sulfone group.

Example 16 — 2,3,5-Trichloro-6-(ethylthio)terephthalonitrile

A solution of 17.9 g. (0.075 mole) of sodium sulfide nonahydrate was added to a slurry of 20.0 g. (0.075 mole) of tetrachloroterephthalonitrile in 125 ml. dimethoxyethane. The mixture exothermed to 40° and then was refluxed for 1.75 hr., cooled to 40°, and treated with 12.9 g. (0.083 mole) ethyl iodide. The resulting mixture was stirred at room temperature overnight, then poured into ice water. The crude product was filtered, dried, then dissolved in acetone to remove insolubles. Removal of acetone gave 13 g. (59% yield) of product, m.r. 129°–131°, which was 98% pure by vpc.

Example 17 — 2,3,5-Trichloro-6-(ethylsulfinyl)terephthalonitrile

A slurry of 4.0 g. (0.014 mole) of 2,3,5-trichloro-6-(ethylthio)terephthalonitrile in 130 ml. acetic and was treated with 30% hydrogen peroxide and heated under reflux. Reaction progress was monitored by thin layer chromatography (TLC) of aliquots. A total of 4.7 g. of 30% hydrogen peroxide (0.04 mole) was added at three intervals and total reflux time was 3 hrs. The mixture was then poured into water and the product was filtered and dried to give 1.35 g. (31% yield) of product which was shown by vpc to consist of 77% of desired sulfoxide and 23% of the sulfide. A pure sample of the desired product, m.p. 165-167, was obtained as a second crop on recrystallization from ethanol.

Anal.: Calc. for $C_{10}H_5Cl_3N_2OS$: C, 39.05; H, 1.64; N, 9.11.
Found: C, 39.08; H, 2.07; N, 9.10.

Example 18 — 2,3,5-Trichloro-6-(ethylsulfonyl)-terephthalonitrile

A slurry of 4.0 g. (0.014 mole) of 2,3,5-trichloro-6-(ethylthio)terephthalonitrile) in 130 ml. acetic acid was treated with 3.9 g. of 30% hydrogen peroxide (0.034 mole) for 1 hr. at reflux. TLC indicated incomplete reaction so an additional 1.5 g. of 30% hydrogen peroxide (total 0.048 mole) was added and the solution refluxed for 1 hour. The reaction mixture was poured into ice water and the precipitate was filtered and dried to yield 2.6 g. (58% yield) of product, m.p. 220°–222°. Recrystallization from ethanol gave a pure sample, m.p. 219°–221°.

Anal.: Calc. for $C_{10}H_5Cl_3N_2O_2S$: C, 37.12; H, 1.56; N, 8.66
Found: C, 37.29; H, 2.04; N, 8.54.

Example 19 — 2,3,5-Trichloro-4-(methylsulfinyl)-benzonitrile 2,3,4,5-Tetrachlorobenzonitrile was reacted with $Na_2S \cdot 9H_2O$ (1:1) in dimethoxy ethane at reflux temperature for 1 ½ hours. An equivalent amount of methyl iodide was reacted with the resulting —SNa salt in situ at room temperature. The methylthio product was then oxidized in c $H_2SO_4$ at 15°C. with a stoichiometric amount of 30% $H_2O_2$ (1 ½ hrs. each, addition time and post-addition contact time). Recrystallization of the crude product from ethanol gave a 59.2% yield of the title compound, m.r. 158°–160°c.

| Elemental Analysis: | % C | % H | % N |
| --- | --- | --- | --- |
| Calculated | 35.7 | 1.49 | 5.22 |
| Found | 35.9 | 1.70 | 5.0 |

Example 20 — 2,3,5-Trichloro-4-(methylsulfonyl)-benzonitrile

A portion of the sulfoxide product of Example 19 was converted to the sulfone by further treatment with 30% $H_2O_2$ (5:1) in c $H_2SO_4$ at 10°–20°C. for 3 hours. Recrystallization of the crude product from ethanol gave a 54.8% yield of the title compound, m.r. 153°–4°C.

| Elemental Analysis: | % C | % H | % N |
| --- | --- | --- | --- |
| Calculated | 33.8 | 1.40 | 4.93 |
| Found | 34.1 | 1.6 | 4.9 |

Example 21

2,3,5-Trichloro-4-(ethylsulfonyl)benzonitrile, m.r. 133°–4°C. (from ethanol) was obtained 97% pure in 72.3% yield from the corresponding sulfoxide by treatment with 30% $H_2O_2$ (in excess) in acetic acid for 15 hours at room temperature.

Example 22 — Mixed halogen compounds a. 2,3,4,5-Tetrachlorobenzonitrile is converted to 6-bromo-2,3,4,5-tetrachloro benzonitrile by vapor phase bromination for 20-30 seconds at 625°–675°C., the reaction products exiting into cold 25–30% aqueous NaOH in order to prevent hydrolysis of the nitrile group during work-up. The 6-bromo compound is treated with sodium sulfide by the method of Example 19 and then reacted in situ with n-butyl bromide to provide 6-bromo-2,3,5-trichloro-4-(n-butylthio)-benzonitrile. Oxidation with chlorine water at 40°–50° converts the latter compound to the corresponding sulfone, having the emperical formula $C_{11}H_9BrCl_3NO_2S$.

b. 3,4,5-Trichlorobenzonitrile is converted by vapor phase bromination at about 650°C. to 2,6-dibromo-3,4,5-trichloro benzonitrile and the latter in turn subjected to displacement of the 4-chloro substituent by $NaS^-$. Upon acidification and treatment with bromine in $CCl_4$, the corresponding -SBr compound is formed and the latter is adducted with propylene to give 2,6-dibromo-3,5dichloro-4-(beta-bromopropylthio)-benzonitrile. The latter is oxidized with a stoichiometric amount of 30% $H_2O_2$ in c $H_2SO_4$ at 15°–20°C. to provide the corresponding sulfoxide, having the empirical formulae $C_{10}H_6Br_3Cl_2NOS$.

c. 4,5-Dichlorophthalonitrile is converted to 3,6-dibromo-4,5-dichlorophthalonitrile by vapor phase bromination in $CCl_4$ vapor at 625°–675°C. The tetrahalo dinitrile is reacted with sodium sulfide and the resulting mercaptide in turn reacted with 3-bromo-2-methyl propene. Upon oxidation of the resulting product with c. $HNO_3$ there is obtained 3,6-dibromo-5-chloro-4-(methallysulfinyl)-phthalonitrile: $C_{12}H_7Br_2ClN_2OS$.

Example 23 — Bromocyanophenyl sulfoxides and sulfones a. Tetrabromoisophthalonitrile, m.p. 345°C. (decomp) is prepared by turbulently down-flowing a pevaporized dilute solution of isophthalonitrile in bromine through a heated, vertical, elongated Vycor reactor for 27 seconds at a temperature of 650° and quenching the exiting reaction products in cold 25–30% aq. NaOH. The crude product is recrystallized from benzene and then reacted with sodium sulfide in isopropanol. The resulting NaS-salt is reacted with 1,2-dibromoethane to provide the corresponding (2-bromoethyl)thio compound Upon dehydrohalogenation with alcoholic KOH and oxidation with hydrogen peroxide in trifluoroacetic acid there is obtained 2,4,5-tribromo-6-vinylsulfonylisophthalonitrile: $C_{10}H_3Br_3N_2O_2S$.

b. Terephthalonitrile is brominated in the manner of (a) preceding and the crude product recrystallized from DMF/benzene (3:1) twice to provdie, analytically pure, the tetrabromoterephthalonitrile (m.r 378°–80°C.). From the initial mother liquor, tribromoterephthalonitrile (m.r. 245°–9°C.) is also recovered. The latter compound is reacted with sodium sulfide and then with 2-bromopropane to yield a sulfide, which upon oxidation with nitric acid provides as a final product 3,6-dibromo-2-(isopropylsulfinyl)terephthalonitrile: $C_{11}H_7Br_2N_2OS$.

c. Tetrabromo-4-mercaptobenzonitrile (Example 1) is converted with chlorine to the corresponding sulfenyl chloride which is then adducted with 2-butene. Oxidation of the resulting adduct with hydrogen peroxide in sulfuric acid gives 2,3,5,6-tetrabromo-4-((2-bromo-1-methylpropyl)sulfonyl)-benzonitrile: $C_{11}H_8Br_5NO_2S$.

Example 24 — 2,3,6-Trichloro-4-methylthiobenzonitrile.

Tetrachloro-4-methylthiobenzonitrile (98%; 7 grams) dissolved in 100 ml. of glyme, together with 10 ml. of glacial acetic acid, 25 ml. of water and 5 grams of ammonium acetate was placed in an electrolysis cell (8 cm. I.D.) over a pool of mercury (cathode) on which a magnetic stirring bar rested. An inverted glass funnel comprising a sintered glass disk ($\approx$5 cm. in diamter) was suspended in the (catholyte) solution with the disk about 1 cm. from the mercury. A 1:1 mixture of water and glyme containing ammonium acetate (est 1 g.) was placed in the funnel and a carbon rod (anode) inserted in the latter mixture (anolyte) through the funnel stem. A standard calomel reference electrode was immersed in the catholyte to the same depth as the sintered disk (membrane). The cell was maintained at a temperature of 24°–34°C. by immersion in a water bath and a direct current of 200–300 milliamperes passed through the cell under a total potential difference of 13–25 volts and at a cathode potential (relatie to the reference electrode) of −1.5 volts, for a period of 6¼ hours. (The mercury cathode was magnetically stirred throughout).

The catholyte solution was withdrawn from the cell and, upon dilution with water, precipitated about 6 grams of solids. By three recrystallizations from methanol, there was obtained from the crude product 2.5 grams of a compound which gave a satisfactory analysis for the title compound and was 99% pure.

Example 25 — 2,3,6-Trichloro-4-methyl sulfinyl and -sulfonylbenzonitriles.

2.5 Grams of the methylthio precursor (Example 24) was dispersed in 40 ml. of conc. $HNO_3$. The mixture was heated with stirring for 12 minutes at 85°C. and poured into ice water. The resulting precipitate was filtered out and dried. The product, off-white, shiny crystals, melted sharply at 197°–9° and was shown to be pure, by thin layer chromatography.

| Analysis | % C | % H | % Cl | % N | % S |
|---|---|---|---|---|---|
| Calc. for sulfoxide | 35.9 | 1.12 | 39.81 | 5.25 | 11.98 |
| Found | 35.2 | 1.6 | 40.36 | 5.2 | 12.05 |

The structure of the sulfoxide was determined by I.R. and by N.M.R. — which showed the ring hydrogen to be adjacent to the sulfoxide group.

2.5 Grams of the methylthio precursor (made as per Example 24) was slurried in 30 ml. conc. $H_2SO_4$ and the slurry stirred at 15°–20°C. for 1½ hours while 3.4 ml. of 30% $H_2O_2$ was added dropwise. After an additional three hours of stirring, the mixture was poured into ice water. The recovered precipitate melted at 170°–177°C. and — by T.L.C. — consisted of about 70% sulfone and 30% sulfoxide. Reoxidation with 2.5 ml. 30% $H_2O_2$ in c $H_2SO_4$ raised the sulfone content to about 90%. The reoxidized product was combined with a similar product from another preparation and subjected to a third oxidation. The final product melted at 170° and was pure sulfone, by T.L.C.

| Analysis | % Cl | % S |
|---|---|---|
| Calc. for sulfone | 37.60 | 11.30 |
| Found | 37.84 | 11.16 |

Example 26 — 2,4,5-Trichloro-6-(methylsulfinyl)-isophthalonitrile.

22.2 Grams (0.08 mole) of the sulfide precursor (Example 6) was dissolved in 350 ml. of chloroform and cooled to 0°C. m-Chloroperoxybenzoic acid (31 grams; 0.18 mole) was added to the stirred solution portionwise in 15 minutes. After stirring overnight the mixture was filtered. The filtrand was stirred with 850 ml. of 0.1N NaOH, filtered out again, washed with water, dilute HOAc and water. The dried solid was freed of insolubles by dissolution in 1700 ml. boiling ethanol and filtering. The filtrate was concentrated to 400 ml. and chilled. The product (12 grams; 51% yield) melted at 237°C. and was 95% pure by T.L.C.

| Analysis | % C | % H | % Cl | % N |
|---|---|---|---|---|
| Calc. for sulfoxide | 36.80 | 1.02 | 36.28 | 9.54 |
| Found | 37.8 | 1.2 | 34.0 | 9.7 |

Example 27 — 2,3,5-Trichloro-6-(methylsulfinyl)-terephthalonitrile.

The corresponding -6-methylthio precursor was prepared from tetrachloroterephthalonitrile by reaction with $Na_2S \cdot 9H_2O$ and then with methyl iodide, in the manner of Example 16.

The sulfide product was then oxidized in g. HOAc with 30% $H_2O_2$ (several fold excess, added incrementally over a total reaction time of about 6 hours) at $\approx$60°C. The sulfoxide product, m.r. 214.5°–217.5°, was obtained in 23% yield.

| Analysis | % C | % H | % N |
|---|---|---|---|
| Calculated | 36.82 | 1.03 | 9.54 |
| Found | 36.86 | 1.56 | 9.47 |

Example 28 — 2,3,5-Trichloro-6-(methylsulfonyl)-terephthalonitrile.

The title compound was obtained in 28% yield by treatment of the precursor sulfide (Example 27) in g. HOAc with a 30 fold excess of 30% $H_2O_2$, added incrementally over a 40-hour reaction period at reflux temperature. By T.L.C., the product was a single compound —confirmed as the sulfone by infrared analysis.

Example 29

Tetrachlorophthalonitrile was reacted in dimethoxyethane and water with sodium sulfide nonahydrate and the resulting product was reacted with ethyl iodide. The melting range of the crude 3,5,6-trichloro-4-ethylthiophthalonitrile product was raised from 82°–9° to 95–9° by one recrystallization from ethanol and to 100.5°–102° by a second recrystallization. Yellow flakes, pure by T.L.C.

| Elemental Analysis | % C | % H | % N |
|---|---|---|---|
| Calc.: $C_{10}H_5Cl_3N_2S$ | 41.17 | 1.72 | 9.61 |
| Found | 41.25 | 1.93 | 9.56 |

Example 30

The sulfide product of Example 29 was oxidized to the corresponding sulfoxide by stirring with 70% nitric acid for 10 minutes at 85°C. A recrystallization of the product from 10:1 ethanol:DMF gave yellow crystals melting at 171.5°–172.5°C. (d).

| Analysis: | % C | % H | % N |
|---|---|---|---|
| Calc.: $C_{10}H_5Cl_3N_2OS$ | 39.02 | 1.63 | 9.11 |
| Found | 39.10 | 1.84 | 9.01 |

Example 31

A portion of the sulfoxide product of Example 30 was oxidized to 3,5,6-trichloro-4-ethylsulfonylphthalonitrile in glacial acetic acid with 30% $H_2O_2$ at ≈85°C. for 90 minutes and with more peroxide at room temperature over a weekend. One recrystallization from ethanol gave colorless crystals melting at 171.5°–173.5°C. Pure by T.L.C.

| Analysis | % C | % H | % N |
|---|---|---|---|
| Calc.: $C_{10}H_5Cl_3N_2O_2S$ | 37.09 | 1.55 | 8.66 |
| Found | 37.22 | 1.86 | 8.65 |

Example 32a 2,4,5-Trichloro-6-methylsulfonylisophthalonitrile was prepared as follows. To a stirred solution of the sulfide precursor (Example 6; 13.9 g., 0.05 mole) in c. $H_2SO_4$ (150 ml, 90%) at 15°C. was added dropwise over a period of 45 minutes, 23 ml. (0.2 mole) of 30% $H_2O_2$. The temperature was kept at 15°–20° throughout. By T.L.C. on an aliquot, all starting sulfide was converted but some sulfoxide was present with the sulfone. Another 23 ml. of 30% $H_2O_2$ was added over a period of 60 minutes at 15°–20°C. and then another 50 ml. of 90% $H_2SO_4$ (to aid solution of the sulfoxide). After stirring overnight at room temperature the mixture was poured over ice. 6 Grams of a solid melting at 245°–252°C. was recovered by filtration, water washing and drying in vacuo. Recrystallization from ethanol gave 1 gram of colorless prisms, melting at 276°–9°C. (d). Essentially pure by T.L.C. A further recrystallization provided an analytical sample melting at 282°–3°C.

| Analysis | % C | % H | % N |
|---|---|---|---|
| Calc.: $C_9H_3Cl_3N_2O_2S$ | 35.30 | 1.40 | 8.96 |
| Found | 34.89 | 0.97 | 9.05 |

Example 32b

The reaction of Example 32a was repeated (with 9.25 g. of the sulfide) but using glacial acetic acid as the reaction medium and altering the thermal profile. After an initial 2-hour oxidation with a 5-fold mole ratio of (30%) $H_2O_2$ at 65°–70°, a product presumed to be the sulfoxide precipitated. In a second stage of oxidation, an equal amount of 30% peroxide was added over a 3-hour period at 90°–95° and the mixture allowed to cool and stir overnight. In a third stage of oxidation, another 5-fold amount of peroxide was added over an 8-hour period at ≈70°C. After stirring and cooling overnight with the last added portion of peroxide, the mixture was again treated essentially as in the third stage. The product slurry was heated to 95° and filtered hot. The dried filtrand weighed 7.8 g. and melted at 281.5°–283.5°C. Its infrared spectrum was identical to that of the product of Example 32a.

Example 33

3,5,6-Trichloro-4-methylsulfinylphthalonitrile, m.p 201.5°–202.5°C. (pure by T.L.C.) was prepared in essentially the manner of Example 30.

Example 34

A portion of the sulfoxide product of Example 33 was treated with $H_2O_2$ (30%) in g. HOAc at about 25°C over a period of several days. The resulting product melted at 175.5°–176.5°C. and analyzed (C, H and N for the corresponding sulfone; 3,5,6-trichloro-4 methylsulfonylphthalonitrile.

Example 35 — 1,4-Benzenedicarbonitrile: 2,3,5-tri chloro-6-((2,3-dibromopropyl)sulfinyl)-

50 Grams (0.188 moles) of tetrachloroterephthalonitrile was reacted in 300 ml. of dimethoxyethane with a solution of 45.15 g. (0.188 moles) $Na_2S$—$9H_2O$ in 100 ml. water at reflux for 55 minutes. The resulting product was reacted in situ at 55°C. with 34.74 g. (0.207 mole) of allyliodide. The final product, the allylthio derivative was freed of impurities by dissolution in acetone and filtration and recovered in 84% yield.

To 5 grams (0.0165 moles) of the sulfide in $CHCl_3$ solution was added 2.63 grams (0.0165 mole) of $Br_2$ in 50 ml. $CCl_4$. After stirring overnight, the mixture was stripped. The oven dried residue, 6.9 grams (90+% yield), on recrystallization from EtOH/acetone/$H_2O$ had a melting range of 151.5°–3°C.

Three grams of the latter product (0.0065 mole) was slurried in 65 ml. g. HOAc, combined with 6 grams of 30% aq. $H_2O_2$ (0.058 mole) and refluxed 2 hours. The crude title product, m.r. 148°–153°C., was precipitated with water in 57% yield (1.7 grams). After two recrystallizations from water, the m.r. was 156°–160°C.

| Analysis | % C | % H | % N |
|---|---|---|---|
| Calc.: $C_{11}H_5Br_2Cl_3N_2OS$ | 27.56 | 1.05 | 5.84 |
| Found | 28.06 | 1.24 | 5.72 |

II. UTILITY EXAMPLES

The compounds of the present invention are useful as biocides. They are generally active as microbicides, fungicides and industrial preservatives. Certain of the compounds are of particular interest as paint film fungistats. Some of the compounds show a useful degree of activity as herbicides and/or insecticides.

The compounds of the invention can be applied to the aerial portions of many growing plants to control leaf-attacking fungal organisms or dispersed in soil or applied to plant seeds to control the root and seed attacking organisms of mold and damping off. In still other operations they can be applied to orchard floor surfaces to control over-wintering spores of many fungal organisms. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay. They also can be employed as a toxicant to control insect pests.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a foliar spray or in seed treatment, it is often convenient to apply the compounds as wettable powders.

The compounds may be used with a wide variety of oils, resin, solvents, pigments and coating additives in formulating organic film-forming compositions having mildew resistance. The more common types of exterior coatings for which these compounds are useful as fungicides include the drying oils, alkyds andn latex-type paints. The film-forming vehicles include the trigylceride esters of unsaturated fatty acids such as linseed oil or soya oil; esters of polycarboxylic acids with polyols, such as reaction products of phthalic anhydride with glycerol or pentaerythritol; oil-modified alkyds; modified phenolic resins, such as aldehyde condensations; melamine resins; synthetic elastomeric latexes; homopolymers or copolymers of olefinically unsaturated compounds, including vinyl acetates and acrylic resins; urethane resins; ether resins and numerous other conventional coating vehicles. Typical pigments which can be combined in exterior paints comprise titanium dioxide, alkaline earth carbonates and silicates, bentonite, mica, metal oxides, carbon, etc. Solvents and co-solvents are used conventionally in both organic-thinned or water-thinned coating compositions, for instance, mineral spirits, polyols, benzoids, etc. Numerous additives can be incorporated in the antifungal paints for suppressing foam, for plasticizing the dried films, for emulsifying latexes, or for accelerating the film cure.

While the antifungal additive is usually incorporated directly into a coating to be applied as a top coat, some organic coatings, can be adequately protected by using the antifungal additive in a primer or intermediate coat. Migration into an adjacent layer from a substrate containing a fungicide can be an effective means for controlling mildew in some applications. A relatively higher local concentration of fungicidal agent may be necessary under such conditions. Direct application of the fungicide with an inert carrier over the organic nutrient surface may be used to protect against fungus growth, but this method may not be desirable for exterior weathered surfaces due to erosion. Some interior surfaces in food processing rooms, such as bakeries, breweries, meat packing plants, etc., also suffer from mildew growth due to extreme conditions of humidity or temperature. Here the weathering effect is not such an important factor, but the use of a fungicide is desirable.

Mildew growth on exterior organic coatings is attributed to several fungi. The relative importance of different species of fungi is climatically dependent; but, Pullularia species usually account for the major number of fungus colonies on painted surfaces in the United States. In warm, moist climates such as the Gulf areas around the 30th parallel, Pullularia species account for about 75% to over 90% of mildew growth. North of the 40th parallel this species amounts to more than half the growth. In the warmer moist areas, Alternaria species, Cladosporium species, and Penicillium species are secondary causes of discoloration. In the norther climates Aspergillus species also is a secondary mildew fungus.

A number of other micro-organisms, such as Rhodotorula (yeast), Monilia, Mucor and Botrytis, are minor causes of mildew. An organic surface that is a nutrient for some fungi may not be a nutrient for others. Generally, a nutrient for other fungi will also support Pullularia growth. Alternaria occurrence is higher in latex paints, whereas Cladosporium does not thrive on a typical latex film. Rhodotorula is associated mostly with drying oil paint vehicles and areas protected from weathering.

The preferred concentrations of the compounds of the invention in the dry coating films is from the minimum inhibitory concentration up to about 2 percent by weight. Higher concentrations may be employed but generally are of no greater benefit.

Example 36 — In vitro fungicide/microbicide tests

In a representative operation, each of the compounds listed in Table I was tested by incorporating it as the sole toxicant in each of from fourteen to eighteen nutrient agars, each inoculated with a different organism from the following list. The results are given in the Table.

| No. | Organism | No. | Organism |
|---|---|---|---|
| 1 | Staphylococcus aureus | 10 | Salmonella typhosa |
| 2 | Escherichia coli | 11 | Pseudomonas sp. strain 10 |
| 3 | Candida albicans | 12 | Mycobacterium phlei |
| 4 | Tricophton mentagrophytes | 13 | Rhizopus nigricans |
| 5 | Bacillus subtilis | 14 | Ceratocystis ips |
| 6 | Aerobacter aerogenes | 15 | Cephaloascus fragans |
| 7 | Asperigillus terreus | 16 | Trichoderm sp. Madison P-42 |
| 8 | Candida pelliculosa | 17 | Pseudomonas aeruginosa |
| 9 | Pullularia pullulans | 18 | Aspergillus nigricans |

TABLE I

| Compound | ppm* | Organism Numbers Killed | Organism Numbers Inhibited |
|---|---|---|---|
| 2,3,5,6-tetrachloro-4-(methylsulfinyl)-benzonitrile | 10 | 4,5,7,12,14,15 | 1 |
|  | 100 | 1,3,8,9,11,13,16 |  |
| 2,3,5,6-tetrachloro-4-(ethylsulfonyl)-benzonitrile | <500 | 1,4,5,12 | 7,9,14,15 |
| 2,3,5,6-tetrachloro-4-(propylsulfonyl)-benzonitrile | <500 | 4,5 | 1,12 |
| 2,3,5,6-tetrachloro-4-(chloromethylsulfinyl)-benzonitrile | <500 | 1,3,4,5,7,8,9,12,14,15,16 |  |
| 2,3,5,6-tetrachloro-4-(methylsulfonyl)-benzonitrile | 10 | 1,3,4,5,7,9,13,14,15 |  |
|  | 100 | 8,12,16 |  |
| 2,3,5,6-tetrachloro-4-(ethylsulfinyl)-benzonitrile | 500 | 4 | 1,5,12 |
| 2,3,5,6-tetrachloro-4-(propylsulfinyl)-benzonitrile | 500 | 4 | 1,12 |
| 2,4,5-trichloro-6-(methylsulfinyl)-isophthalonitrile | 500 | 6 |  |
|  | 100 | 1,2,3,4,7,8,9,10,12,13,14,16 |  |
|  | 10 | 5,15 | 4,7,8,12 |
| 2,3,5-trichloro-6-(ethylsulfonyl)-terephthalonitrile | 500 | 9,18 |  |
|  | 100 | 1,3,4,5,12,13,14,16 | 8,9,10 |
|  | 10 |  | 12,16 |
| 2,3,5,6-tetrachloro-4-(chloromethylsulfonyl)-benzonitrile | 100 | 8,16 |  |
|  | 10 | 1,3,4,5,7,9,12,14,15 |  |
| 2,3,5-trichloro-4-(methylsulfinyl)-benzonitrile | 500 | 1,4,5,7,12,13,14,15,16 | 3,8,9,10 |
| 2,3,5-trichloro-4-(ethylsulfonyl)-benzonitrile | 500 | 3 |  |
|  | 100 | 1,4,7,9,12,13,14,15,16 | 8 |
|  | 10 | 5 | 14 |
| 2,3,6-trichloro-4-(methylsulfonyl)-benzonitrile | 500 | 12 | 1 |
|  | 1000 | 1,4,12 |  |
| 2,3,6-trichloro-4-(methylsulfinyl)-benzonitrile | 1000 |  | 4 |
| 2,3,5-trichloro-6-(methylsulfinyl)-terephthalonitrile | 500 | 1,3,4,5,8,9,10,12,13,14,16,18 | 2,11 |
|  | 100 | 1,3,4,5,8,9,12,13,14,16,18 | 10,11 |
|  | 10 | 9 |  |
| 2,3,5-trichloro-6-(methylsulfonyl)-terephthalonitrile | 500 | 1,2,3,4,5,8,9,10,12,13,14,16,18 | 11 |
|  | 100 | 1,3,4,5,8,9,10,12,13,14,16,18 | 2,11 |
|  | 10 | 4 | 5,12 |
| 2,4,5-trichloro-6-(ethylsulfinyl)-isophthalonitrile | 500 | 1–5, 8–10, 12–14,16,18 |  |
|  | 100 | 1,3–5,8–10,12–14,16,18 |  |
|  | 10 | 1,4,5,9,12 | 3 |
| 2,4,5-trichloro-6-(ethylsulfonyl)-isophthalonitrile | 500 | 1,3–5,8,9,12–14,16,18 |  |
|  | 100 | 1,3–5,8,9,12,14 | 16 |
|  | 10 |  | 4 |
| 2,4,5-trichloro-6-(methylsulfonyl)-isophthalonitrile | 500 | 1,4,5,12 | 8 |
|  | 100 | 1,12 |  |
|  | 10 |  | 1 |
| 3,4,6-trichloro-5-(methylsulfinyl)-phthalonitrile | 500 | 1–5,8–14,16,18 |  |
|  | 100 | 1,3–5,8–10,12–14,16,18 | 11 |
|  | 10 | 1,4,5,9,12,14,16 |  |
|  | 1 | 4 | 1,5,12 |

TABLE I-continued

| Compound | ppm* | Organism Numbers Killed | Organism Numbers Inhibited |
|---|---|---|---|
| 3,4,6-trichloro-5-(ethyl-sulfinyl)-phthalonitrile | 500 | 1,3–5,8–14,16,18 | |
| | 100 | 1,3–5,8,9,12–14,16,18 | 10,11 |
| | 10 | 4,5,9,12 | 1 |
| 3,4,6-trichloro-5-(ethyl-sulfonyl)-phthalonitrile | 500 | 1,3–5,8–10,12–14,16,18 | |
| | 100 | 1,3–5,8–10,12–14,16,18 | |
| | 10 | 4,5,9,12 | 1,3 |
| 2,3,6-trichloro-5-((2,3-dibromo-propyl)-sulfinyl)-terephthalo- | 500 | 1,4,5,9,11,12,13,14,16,18 | 8 |
| | 100 | 1,4,5,9,11,12,13,14,18 | 8 |
| | 10 | 4,5,9,12 | 11,14 |
| 3,4,6-trichloro-5-(methyl-sulfonyl)-phthalonitrile | 100 | 1,3–5,8–10,12–14,16,18 | 2 |
| | 10 | 4,5,8,12 | 1,3,9,16 |
| | 1 | 4,5 | |

*Parts per million, conc'n. in agar.

Example 37 — Foliage Fungicide Tests

Host plants were sprayed to run-off with a solution or dispersion of the test chemical in an 80/20 $H_2O$/isopropanol solution. The plants were then inoculated with the pathogen and stored under conditions of humidity and temperature suitable for infection and development of disease. Untreated check plants were rated as showing 0% control and absence of disease was rated — after 10 days — as 100% control. Each test included control plants treated with commercial fungicides. The following compounds gave the degrees of control shown on the pathogens listed:

TABLE II

| Compound | Conc'n (ppm) In Spray | Percent Control of: Downey Mildew | Percent Control of: Tomato Late Blight | Percent Control of: Rice Blast |
|---|---|---|---|---|
| 2,3,5,6-tetrachloro-4-(methyl-sulfonyl)-benzonitrile | 400 | 93 | 75 | 75 |
| 2,4,5-trichloro-6-(methyl-sulfinyl)-isophthalonitrile | 400 | 100 | — | — |
| | 150 | 97 | | |
| | 37 | 97 | | |
| 2,3,5,6-tetrachloro-4-(chloro-methylsulfonyl)-benzonitrile | 400 | 50 | — | — |

Example 38 — Tests on Bean Mildew

The following compounds, when tested at a concentration of 4000 parts per million against bean mildew fungus in the manner of Example 32, gave the degrees of control shown.

TABLE III

| Compound | % Control |
|---|---|
| 2,3,5,6-tetrachloro-4-(methylsulfonyl)-benzonitrile | 100 |
| 2,3,6-trichloro-4-(methylsulfinyl benzonitrile | 70 |
| 2,3,5-trichloro-4-(ethylsulfonyl)-benzonitrile | 100 |

Example 39 — Pre-emergent herbicide tests

Seeds representing grassy weeds, broadleaf weeds and broadleaf crops were pot-planted in "jiffy mix", sprayed with an aqueous solution or dispersion of the test chemical in amounts equivalent to 20 lbs./acre and then covered. After about 2 weeks in a greenhouse under normal variable conditions of temperature, humidity and water supply, comparisons of germination, growth and injury vis a vis untreated check plants were made.

The following compounds gave the results shown.

TABLE IV

| Compound | Plant | % Control* |
|---|---|---|
| 2,4,5-trichloro-6-(methylsulfinyl)-isophthalonitrile | Pig Weeds | 80 |
| 2,3,5-trichloro-4-(ethylsulfonyl)-benzonitrile | Bindweed | 40 |
| | Pig Weeds | 60 |
| 2,3,5,6-tetrachloro-4-(methylsulfonyl)-benzonitrile | Bindweed | 100 |
| | Yellow Foxtail | 100 |
| 2,3,5-trichloro-4-(methylsulfonyl) benzonitrile | Pig Weeds | 90 |
| | Crabgrass | 50 |
| 2,3,5-trichloro-4-(methylsulfinyl)-benzonitrile | Pig Weeds | 90 |
| 2,3,5,6-tetrachloro-4-(chloromethyl-sulfonyl)-benzonitrile | Pig Weeds | 100 |

*
0% no effect
100% all plants killed

Example 40 — Post-emergence herbicide test

The same plant species used in the pre-emergence test (Example 34) were grown in plant bands to an average height of four inches and sprayed to run-off with a 4000 parts per million solution of 2,3,5-trichloro-4-(methylsulfinyl)-benzonitrile. After two weeks the plants were compared with untreated check plants of the same species. 100% control of both Pig weeds and Wild mustard-charlock was observed.

Example 41 — Aquatic Zootoxin Test

The test chemicals were formulated at a concentrations of 500 parts per million and then diluted with water by syringe to a concentration of 1 part per million. Immediately thereafter yellow fever mosquito larvae were introduced. After 24 hours, mortality counts were made. The following results were obtained.

TABLE V

| Compound | % Control |
| --- | --- |
| 2,3,5-trichloro-4-(methylsulfinyl)-benzonitrile | 100 |
| 2,3,5-trichloro-4-(ethylsulfonyl)-benzonitrile | 100 |

Example 42 — Residual contact control of newly hatched coddling moth larvae.

A thin layer of bean diet was placed in a Petrie dish and covered with a thin layer of melted paraffin. When cooled, the wax surface was penetrated by a circle of points mounted on a hot iron. An aqueous dispersion of 2,3,5-trichloro-4-(ethylsulfonyl)-benzonitrile (500 parts per million) was sprayed on the perforated wax layer and a mass of coddling moth eggs placed thereon. After 6 days, frass piles were checked for as an indication of the number of active larvae. No frass piles resulted, i.e., 100% control was obtained.

Example 43 — Paint Fungistasis.

The mere fact that a compound has fungicidal activity does not mean that it will be effective as a paint fungistat on exterior surfaces for long periods of time. Other properties, such as volatility and water leachability are also highly important. Similarly, stability of the compound as a component of a given paint formulation is essential to prolonged "in-the-can" shelf life. Although field tests are generally essential to competitive evaluation, laboratory tests such as the following are commonly employed to establish paint fungistat utility for fungicidal compounds (see, for example, U.S. Pat. No. 3,736,280).

Test A

Volatility and Water Leachability

Three ml. of a 2% solution of the test compound in toluene or Dowanol PM, as appropriate, is applied to each of four, 9 cm. diameter, numbered, pre-weighed glass fiber filter pads (reeve angel No. 934AH) supported horizontally on a wire mesh in a hood. The treated pads are air dried overnight in the hood and re-weighed. (Humidity effects neglected).

To determine volatility, two of the weighed pads are exposed for one week in a 50°C. oven, cooled and weighed. Rating is on percent retention.

To measure water leachability, the remaining two pads are continuously extracted with flowing water (3 volumes/hr.). Both pads are removed after 2 hours, air-dried at ambient conditions and weighed. They are then exposed for an additional 6 hours, re-dried and weighed. Rating is on percent retention.

Test B — Paint Film Preservation

Tropical Chamber Test

The test compound is mixed with a paint in an amount of 1% (or otherwise, as noted) by wt. and the mixture painted onto replicate pinewood panels. The panels are hung in a test chamber in which a relative humidity of 90-100% and a temperature of from 80° to 84°F. is maintained. The painted surface of the panel is periodically inspected for mold and compared (for control) to otherwise identical panels coated with the same paint but containing no fungistat and to other panels coated with the same paint but containing an effective amount of a standard commercial preservative. Rating is by elapsed time and the presence or absence of mold. This test can be made with either freshly mixed or aged paints.

Test C

Accelerated Aging Test (Shelf Life)

The following procedure is used to test for fungistatic activity of a paint (containing a test chemical) before or after it has been held 21 days at 50°C. The pH of the test paint is also checked after aging. This test is run in replicate using either of the following test organisms:
*Pullularia pullulans*
*Aspergillus oryzae*
*Aspergillus niger*

Sample Preparation. No. 30 Whatman filter paper is given one brush coat of the test paint on each side of the paper; sufficient drying time is allowed after the first side is painted before painting the reverse side. The paint-impregnated samples are permitted to dry 48 hours, after which they are marked and cut into 1¼ inch squares. The marking is done by drawing a guide line with black waterproof ink one-eighth inch from each edge of the square specimen. Culture Medium. The culture medium has the following composition:

| | |
| --- | --- |
| $NaNO_3$ | 3.0 gms. |
| $MgSO_4.7H_2O$ | 0.5 |
| $K_2HOP_4$ | 1.0 |
| KCl | 0.2 |
| Sucrose | 30.0 |
| Dist. Water | 1000 |

The above ingredients were mixed and autoclaved for 30 minutes at a pressure of 15 p.s.i. Under sterile conditions, the medium is poured into 10 cm. Petri dishes, about 30 ml. per dish, and allowed to harden.

Inoculum. The inoculum is prepared by adding 10 ml. of distilled water containing a few drops of non-toxic wetting agent to a fruiting culture of the test organism growing in a 10 cm. petri dish. The spores are forced into suspension by brushing the surface of the culture with a sterile camel's hair brush. This suspension is diluted to 100 ml. with distilled water. The test samples are laid down firmly on the center of the hardened culture medium. Approximately 1.5 ml. of the inoculum is distributed with a pipette over the surface of the sample and the culture medium. The inoculated plates are then incubated at 28° to 30°C. and a relative humidity of 85 to 90%, after which the plates are examined and the results recorded.

The following compounds were each subjected to one or more of tests A, B and C, as noted in Table VI, or were field tested (Table VII; Example 44).

1. 2,3,5-trichloro-4-(ethylsulfonyl)-benzonitrile
2. 2,3,5,6-tetrachloro-4-(methylsulfinyl)-benzonitrile 3. 2,3,5,6-tetrachloro-4-(methylsulfonyl)-benzonitrile
4. 2,4,5-trichloro-6-(methylsulfinyl)-isophthalonitrile
5. 2,3,5,6-tetrachloro-4-(methylsulfonyl)-pyridine: (DOWICIL S-13, a commercial paint fungistat).
6. 2,3,5,6-tetrachloro-4-(ethylsulfinyl)-benzonitrile
7. 2,3,5,6-tetrachloro-4-(n-propylsulfinyl)-benzonitrile
8. 2,3,6-trichloro-4-(methylsulfonyl)-benzonitrile
9. 2,3,5-trichloro-4-(methylsulfonyl)-benzonitrile
10. 2,3,5-trichloro-4-(ethylsulfonyl)-benzonitrile
11. VANCIDE PA (A commercial preservative).

TABLE VI

| Compound Number | TEST A Percent Retention | | | ACCELERATED AGING TESTS (21 days at 50°C) | | | |
|---|---|---|---|---|---|---|---|
| | After 7 days at 50°C. (Volatility) | After 2 hrs. | 8 hrs. (Leachability) | Conc'n in Paint(1) | pH of Paint | Test used for fungistatic activity | Results |
| 1 | 97 | 98 | 89 | 1.0% wt. | 9 | B | No mold |
| 2 | Not Determined | | | 0.5 | 9.2 | C | No mold |
| 3 | 98 | 90 | 86 | | Not Run | | |
| 4 | 99 | 96 | 94 | 1.0 | 7 | C | No mold |
| 5 | 92 | — | 65 | 0.5 | 6.9 | C | No mold |

NOTES:
(1)Dow acrylate latex paint, No. 1884.

Example 44 — Field Tests. Paint Film Preservation.

Replicate test panels painted with an alkyd or latex paint containing the test compound in regularly varying concentrations are placed on outdoor racks at an angle of 45° with the ground and facing south. The panels are put out at the beginning of the mildew season and observations for mold growth made periodically. Otherwise identical panels are made up without the test compound and exposed for comparison. Other panels are made up with commercial preservatives in place of the test compounds and identically exposed. The test panels of Table VII were exposed for 5 months at Lake Jackson, Tex.

TABLE VII

| Compound Number | Alkyd Paint | Conc'n (%/wt) Giving Fungus Control in Fresh AC 35(1) | Aged(2) AC 35 |
|---|---|---|---|
| 6 | >1.0 | 0.5 | 0.5 |
| 7 | >1.0 | 0.5 | 0.5 |
| 8 | >1.0 | 1.0 | 1.0 |
| 9 | >1.0 | 1.0 | 1.0 |
| 10 | >1.0 | 0.5 | 1.0 |
| 5 | | 0.5 | >1.0 |
| 11 | | 0.5 | >1.0 |

NOTES
(1) An acrylate latex
(2) Aged 21 days at 50°C.

I claim:

1. A compound of the formula

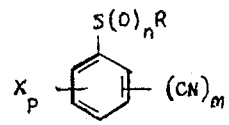

wherein R is an alkyl or alkenyl group having from one to four carbons and substituted with from zero to two —Br, —Cl or —F radicals; $m$ is 1 or 2; $n$ is 1 or 2; $p$ is 2, 3 or 4; and X is —Br or —Cl, independently, in each occurrence.

2. The compounds of claim 1 wherein $m$ is 2.

3. The compounds of claim 1 in which the sum of $m$ and $p$ are 5 and X is —Br or —Cl, the same in each occurrence.

4. The compounds of claim 1 in which R has one or two carbons.

5. The compounds of claim 3 which are phthalonitriles.

6. 2,3,5,6-Tetrachloro-4-(methylsulfonyl)-benzonitrile.

7. 2,3,5,6-Tetrachloro-4-(chloromethylsulfonyl)-benzonitrile.

8. 2,4,5-Trichloro-6-(ethylsulfinyl)-isophthalonitrile.

9. 3,4,6-Trichloro-5-(methylsulfinyl)-phthalonitrile.

10. 3,4,6-Trichloro-5-methylsulfonyl)-phthalonitrile.

* * * * *